H. J. ROBER.
LAWN TRIMMER.
APPLICATION FILED JAN. 10, 1908.
911,073.
Patented Feb. 2, 1909.
2 SHEETS—SHEET 1.
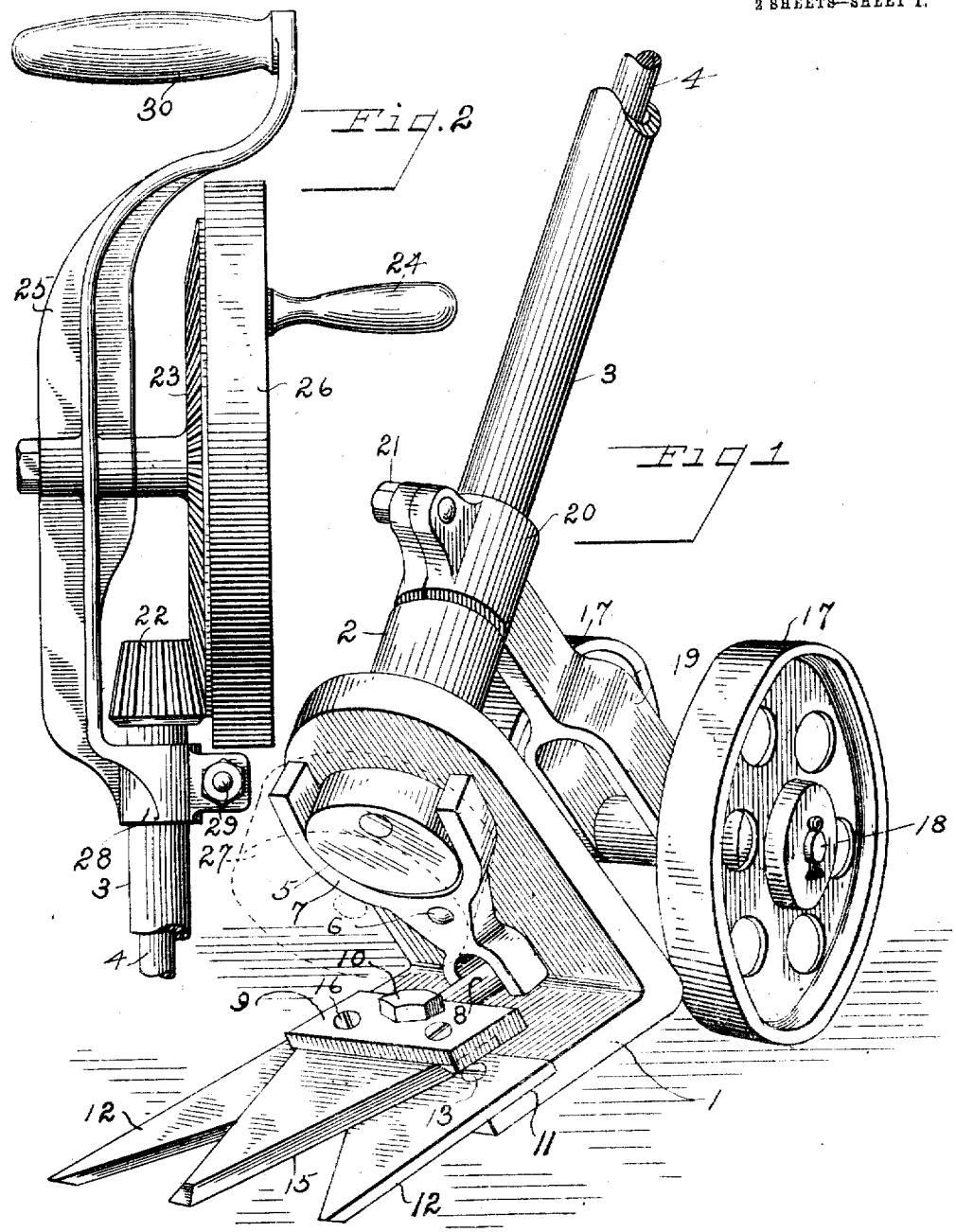
WITNESSES:
INVENTOR.
ATTORNEY.

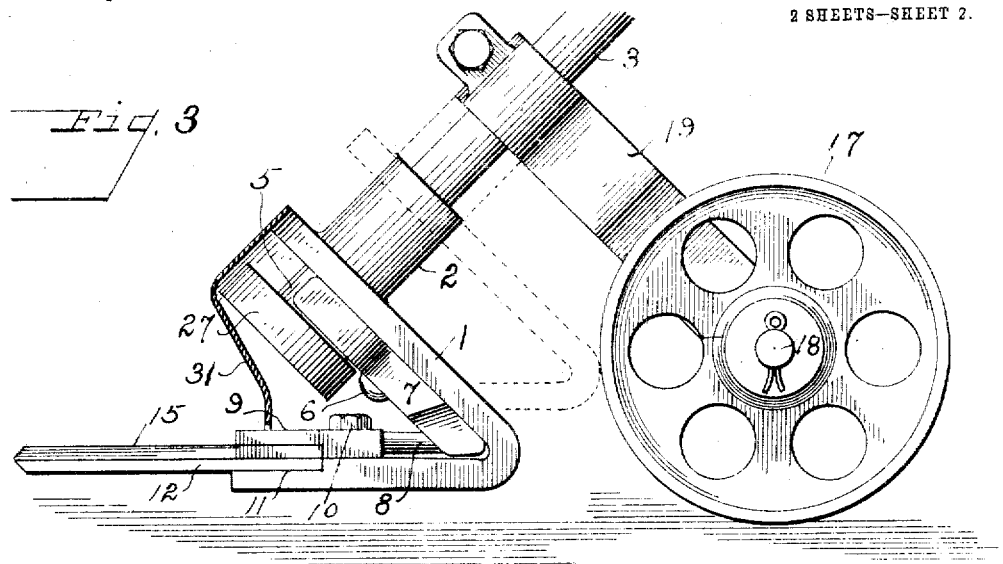
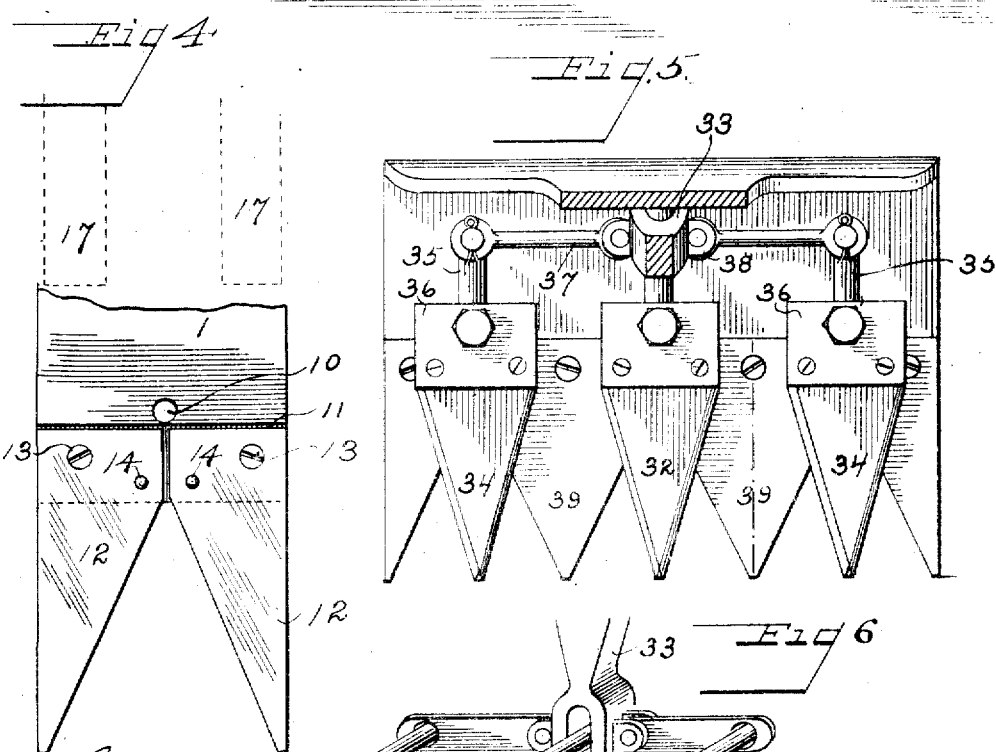
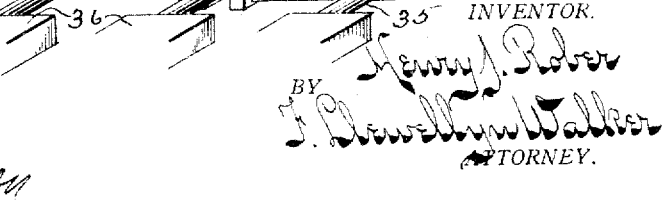

UNITED STATES PATENT OFFICE.

HENRY J. ROBER, OF SPRINGFIELD, OHIO.

LAWN-TRIMMER.

No. 911,073.　　　Specification of Letters Patent.　　　Patented Feb. 2, 1909.

Application filed January 10, 1908. Serial No. 410,081.

*To all whom it may concern:*

Be it known that I, HENRY J. ROBER, a citizen of the United States, residing at Springfield, in the county of Clark and State of Ohio, have invented certain new and useful Improvements in Lawn-Trimmers, of which the following is a specification.

My invention relates to lawn mowers, and particularly to lawn trimmers for use supplemental to the ordinary mower.

The machine hereinafter described is especially adapted for trimming the edges of lawns adjacent to buildings, curbs, fences or shrubbery, also in recesses and angles of walls and other positions inaccessible to the ordinary lawn mower. The machine is also adapted to certain garden uses, such as trimming or thinning beds of growing vegetables, or in harvesting the produce.

The object of the invention is to greatly simplify the structure as well as the means and mode of operation of such devices whereby they will not only be cheapened in construction, but will be rendered more efficient in use, more easily operated, and unlikely to get out of repair.

Further objects of the invention are to provide a machine that will be readily adjustable for different height of cut, and in which the driving mechanism will be easily reversible, from right to left and vice versa, for either a right or left handed operator and particularly to enable the machine to be used in close proximity to a wall on either side.

A further object is to provide cutting blades of such shape and such means of attaching them, that the blades may be removed and sharpened without the use of special appliances, and to insure the replacing of the blades in proper alinement.

With the above primary and other incidental objects in view as will appear from the specification, the invention consists of the means, mechanism, construction, and mode of operation, hereinafter described and set forth in the claims.

In the drawings Figure 1 is a perspective view of the forward or operating portion of the machine. Fig. 2 is a view of the upper handle portion showing the driving mechanism. Fig. 3 is a side elevation of the operating portion of the machine, showing by dotted lines the range of adjustment for different heights of cut. Fig. 4 is a detail plan view illustrating the method of attaching the blades, and in dotted lines the relative position of the carrying wheels. Fig. 5 is a plan view of a modified construction, showing the use of a plurality of cutting blades and their driving connections. Fig. 6 shows a modification similar to that of Fig. 5 with a different method of actuating the several blades.

Like parts are indicated by similar characters of reference throughout the several views.

In constructing the machine there is employed a main frame member 1, somewhat L shaped, the upper portion of which is inclined forward as shown in Figs. 1 and 3. Projecting rearward from the main frame 1 is a boss 2 to which is secured a rearwardly and upwardly extending tubular handle 3, through which extends a revoluble shaft 4, provided with suitable bearings and carrying at its lower end an eccentric 5. Pivoted at 6 upon the main frame 1 is a double yoke 7 the upper bifurcated end of which engages the eccentric 5, while the lower bifurcated end engages the tail 8 of an oscillatory block 9 pivoted at 10 on the horizontal portion of the main frame 1. The forward end of the main frame 1 is recessed or rabbeted as at 11, in which recess are located two outwardly inclined or diverging stationary cutter blades 12. It is obvious that a single blade having a V shaped recess provided with cutting edges might be employed, but the use of separate blades as shown is preferable, since either blade if damaged could be easily replaced without disturbing the other, and the separate blades may be readily sharpened with such whetstones or sharpening devices most likely to be found at hand, and without the use of special appliances. The respective blades 12 are retained in position on the main frame by screws 13. To insure the return of the blades, when removed, to proper alinement, and to provide for the proper positioning of interchangeable sets of blades, dowel pins 14 are located in the main frame 1, which engage corresponding holes in the respective blades, thus obviating any danger of unalinement. The blades 12 are located with their upper surfaces flush with the surface of the main frame. Attached to the oscillatory block 9 and adapted to oscillate in a horizontal plane immediately above the blades 12 is a movable blade 15 coöperating with the stationary blades 12 to shear the grass or other material. The blade 15 is secured to the block 9 by screws 16 and oscillates therewith. The tail 8 of the block 9 extending within the bifurcation of the lower end of the yoke 7 causes the block and therewith the blade 15 to oscillate in unison with the yoke 7 which is actuated by the revoluble movement of the shaft 4 and eccentric 5, carried thereby.

Carrying wheels 17 are provided, mounted on an axle 18 upon which is supported a standard 19 adjustably connected upon the handle 3 by a split collar 20 clamped upon the handle in the usual manner by a clamp screw or bolt 21. By loosening the screw 21 the handle may be adjusted up and down through the collar 20 thus varying the relation of the main frame with the surface of the ground, for different heights of cut as indicated by dotted lines in Fig. 3. The handle 3 may also be adjusted revolubly within the split collar 20 to incline the frame 1 with the wheel base or the surface of the ground in order to more easily trim the bottom angle of a terrace, or to shape a row of growing plants such as a walk border of ornamental plants. The shaft 4 is extended beyond the upper end of the tubular handle 3 and carries the bevel pinion 22, which meshes with a bevel drive gear 23 provided with the operating crank 24 and journaled on a trunnion on a supporting member 25. The bevel drive gear 23 is preferably extended as at 26 to form a balance or fly wheel to facilitate the operation of the machine. However for certain classes of work it is preferable to provide a balance disk 27 on the lower end of the shaft 4 beyond the eccentric 5 as shown fully in Fig. 3 and in dotted lines in Fig. 1. A balance wheel either as at 26 or 27 will assist materially toward the smooth operation of the machine and obviate undue vibration of the parts. The supporting member 25 is adjustably secured upon the handle 3 by a split collar 28 operated by a clamping screw 29 similar to the collar 20 and screw 21. The upper end of the member 25 is formed into the handle or grip 30 by which the machine is propelled. The member 25 is revolubly adjustable on the handle 3 that the drive gear 23 and crank 24 may be turned to either side of the handle to accommodate either a right or left handed person, and especially to permit the use of the machine adjacent to a wall on either side, without the interference of the crank with the wall. A housing, 31, not shown in Fig. 1 but shown in section in Fig. 3 incloses and protects the working parts of the machine against accident and the entrance of dirt or grass clippings. The carrying wheels 17 are located within the side lines of the main frame as indicated by dotted lines in Fig. 4.

For certain purposes a machine of greater width having a plurality of cutting blades may be desired. In Fig. 5 is illustrated a machine having three oscillating blades, the intermediate blade 32 corresponding to the blade 15 of the single structure, and operated in a similar manner by a yoke 33. The outer blades 34 are pivoted to the main frame which is extended laterally to accommodate the blades.

In the drawing the rear extremity of the tail 35 of the oscillatory blocks 36 is shown upturned to form a trunnion for a link 37 pivotally connected at one end to said upturned portion of the tail 35 and at the other end to the lugs or ears 38 on the yoke 33.

While the above method is described and shown it is obvious that other methods of attaching the tail portions 35 with the yoke 33 might be employed, which would operate equally as well.

The intermediate stationary blades 39 of the modified structure may be V shaped as shown, or may be in two portions as indicated by dot and dash line in said Fig. 5.

It will be apparent from the above description that there is thus produced a trimmer of the class described, having the particular features of advantage before enumerated as desirable, but which is obviously susceptible of modification in its form, proportion, detail construction and arrangement of parts without departing from the principles involved or sacrificing any of their advantages.

Having thus described my invention I claim;

1. In a machine as described an angular main frame, an upwardly inclined handle on which said frame is supported, stationary divergent cutting blades carried on said frame, a double-edged oscillating cutting blade pivoted on the main frame, two carrying wheels, an axle on which said wheels are mounted, a standard projecting upward from said axle intermediate said wheels, said standard terminating in a collar within which said handle is longitudinally and revolubly adjustable, said wheels normally extending substantially flush with the sides of said main frame, substantially as specified.

2. In a machine as described, a main frame, stationary cutting blades and an oscillating blade on said frame, a rearward extending tail portion connected to said oscillating blade, a double yoke member pivoted on said main frame, one end of said yoke engaging said extended tail portion, and an actuating revoluble eccentric engaged by the opposite end of said yoke, substantially as specified.

3. In a machine as described, a main frame, a handle upon which said frame is supported, cutting blades and actuating mechanism therefor, carrying wheels, a standard supported on said wheels and engaging said handle, said handle being both revolubly and longitudinally adjustable relative to said standard and wheels, substantially as specified.

4. In a machine as described, a main frame, carrying wheels, a handle, stationary blades on said frame, an oscillatory blade mounted on said frame, a tail portion attached to said blade, a revoluble eccentric, means for actuating same, a member pivoted on said frame and bifurcated at its opposite ends, one of said bifurcated ends engaging said tail portion and the other bifurcated end engaging said eccentric, substantially as specified.

5. In a machine as described, a main frame, carrying wheels, a handle stationary cutting blades on said frame, an oscillatory blade pivoted on said frame, a tail portion attached to said blade, a revoluble eccentric, means for actuating same, a member pivoted on said frame and bifurcated at its opposite ends one of said bifurcated ends engaging said tail portion and the other bifurcated end engaging said eccentric, independent oscillatory blades on either side of the first named oscillatory blade, links pivoted to said bifurcated member and engaging the independent oscillatory blades whereby all of said blades will be caused to oscillate in unison, substantially as specified.

6. In a machine as described, a main frame, a handle attached thereto, cutting blades and actuating mechanism therefor, carrying wheels, said main frame being substantially V shaped, with its lower portion substantially parallel with the ground, and its upper portion substantially at right angles to the upward and rearward extending handle, substantially as specified.

7. In a machine as described, a main frame, carrying wheels an upward and rearward inclined tubular handle, stationary divergent cutting blades on said frame, a pivoted oscillating cutting blade coöperating with said stationary blades, a revoluble shaft extending through said tubular handle, an eccentric carried on said shaft, a pivoted yoke member on said frame engaging said eccentric and oscillated thereby, said yoke member in turn engaging said pivoted oscillating cutter blade and oscillating said blade on its pivotal connection, a pinion on the upper end of said shaft, a supporting member adjustably mounted on said handle and supporting a drive gear and crank, which gear meshes with said pinion, said supporting member, crank and gear being reversible on said handle, substantially as specified.

In testimony whereof I have hereunto set my hand this 4th day of January 1908.

HENRY J. ROBER.

Witnesses:
JACOB KLEEMAN,
J. R. KELLY.